United States Patent [19]

Hagen et al.

[11] Patent Number: 4,906,378

[45] Date of Patent: Mar. 6, 1990

[54] COMPOSITE CHROMATOGRAPHIC ARTICLE

[75] Inventors: Donald F. Hagen, Woodbury; Steven J. St. Mary, St. Paul; Louise A. Errede, North Oaks, all of Minn.

[73] Assignee: Minnesota Mining and Manufacturing Company, St. Paul, Minn.

[21] Appl. No.: 274,767

[22] Filed: Nov. 22, 1988

Related U.S. Application Data

[62] Division of Ser. No. 137,811, Dec. 28, 1987, Pat. No. 4,810,381.

[51] Int. Cl.⁴ ............................................. B01D 15/08
[52] U.S. Cl. ................................... 210/635; 210/657; 210/658; 210/198.3
[58] Field of Search ............ 210/635, 658, 656, 198.3, 210/657

[56] References Cited

U.S. PATENT DOCUMENTS

| | | | |
|---|---|---|---|
| 2,986,280 | 5/1961 | Magnuson et al. | 210/198 |
| 3,864,124 | 2/1975 | Breton et al. | 75/212 |
| 4,153,661 | 5/1979 | Ree et al. | 264/120 |
| 4,160,059 | 7/1979 | Samejima | 210/502.1 |
| 4,194,040 | 3/1980 | Breton et al. | 428/308 |
| 4,342,811 | 8/1982 | Lopatin et al. | 210/502.1 |
| 4,373,519 | 2/1983 | Errede et al. | 128/156 |
| 4,385,093 | 5/1983 | Hubis | 428/317.9 |
| 4,460,642 | 7/1984 | Errede et al. | 428/283 |
| 4,565,663 | 1/1986 | Errede et al. | 264/120 |
| 4,680,221 | 7/1987 | Murayama et al. | 210/508 |
| 4,741,830 | 5/1988 | Hauck et al. | 210/502.1 |

FOREIGN PATENT DOCUMENTS

| | | | |
|---|---|---|---|
| 0047617 | 3/1982 | European Pat. Off. | 210/198.2 |
| 0103875 | 3/1983 | European Pat. Off. | 210/198.2 |
| 8503013 | 7/1985 | PCT Int'l Appl. | 210/198.2 |

*Primary Examiner*—Ernest G. Therkorn
*Attorney, Agent, or Firm*—Donald M. Sell; Walter N. Kirn; Lorraine R. Sherman

[57] ABSTRACT

A composite chromatographic article comprising:
(a) a polytetrafluoroethylene fibril matrix, and
(b) non-swellable sorptive particles enmeshed in said matrix, the ratio of non-swellable sorptive particles to polytetrafluoroethylene being in the range of 19:1 to 4:1 by weight, said composite article having a net surface energy in the range of 20 to 300 milliNewtons per meter.

32 Claims, 2 Drawing Sheets

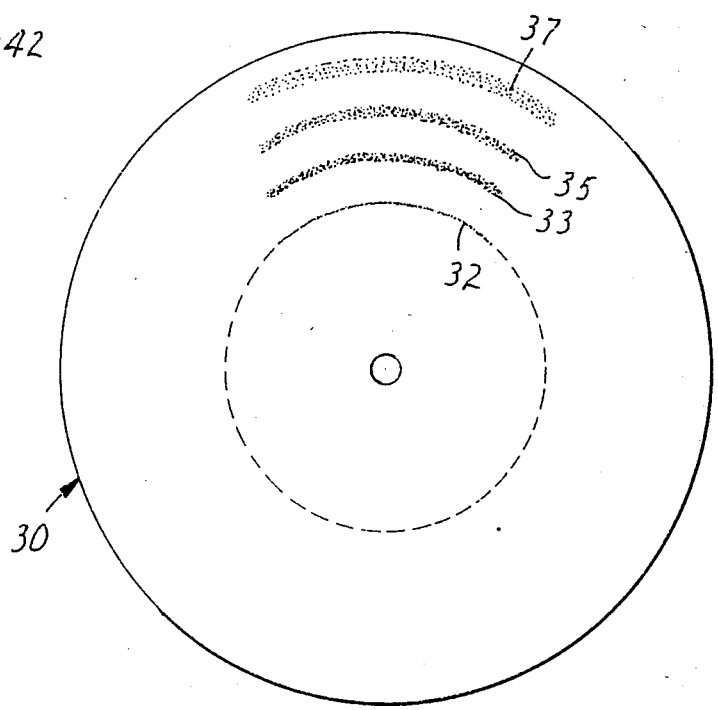
FIG. 4
FIG. 3

COMPOSITE CHROMATOGRAPHIC ARTICLE

This is a division of application Ser. No. 07/137,811 filed Dec. 28, 1987, now U.S. Pat. No. 4,810,381.

FIELD OF THE INVENTION

This invention relates to articles which are composite structures and a method therefore, the articles comprising a polytetrafluoroethylene (PTFE) fibril matrix in which is enmeshed non-swellable particulate. In another aspect, a method of using the composite structures as chromatographic articles are disclosed.

BACKGROUND OF THE INVENTION

Chromatographic processes are known in the art. They provide a means of separating and analyzing mixtures of solutions by selective adsorption on materials such as nylon, alumina, and silica. The process is based on differences in the distribution ratios of the components of mixtures between a mutually immiscible mobile and a fixed stationary phase. In particular, there are formed isolated spots or bands which can be separated mechanically and further examined. In thin layer chromatography, it is known to use thin films, such as silica mixed with a binder (e.g. calcium sulfate) adhered to glass for the separating vehicle.

U.S. Pat. No. 4,153,661 discloses a method of making a polytetrafluoroethylene composite sheet comprising a PTFE matrix with particulate material, which is substantially insoluble in water, dispersed therein. The resulting sheet is extremely pliable, akin to doe skin. It is said to be useful as an electronic insulator or a semipermeable membrane.

U.S. Pat. No. 4,373,519 discloses a composite wound dressing comprising a PTFE matrix with water-swellable hydrophilic absorptive particles enmeshed in the matrix, and, optionally, a partially occlusive film coated on one surface of the matrix. It is disclosed that the particulate material can account for from 40 to 90% by weight of the total composition, of which up to 50% can be inert property modifier particles. Examples of property modifier particles include silica, kaolin, talc, bentonite, vermiculite, etc. The sheets are described as conformable and chamois-like.

U.S. Pat. Nos. 4,565,663 and 4,460,642, which are related to U.S. Pat. No. 4,373,519 (a division of a continuation-in-part application and a continuation-in-part, respectively) disclose water-swellable composite sheets having a PTFE matrix in which water-swellable hydrophilic absorptive particles are enmeshed. As in U.S. Pat. No. 4,373,519 the water-swellable particulate can account for from 40 to 90% by weight of the total composition, of which up to 50% by weight can be inert property modifier particles, e.g. silica. The sheets are described as conformable and chamois-like. It is disclosed that they can be used as chromatographic materials. It is also disclosed that certain water-swellable cation exchange resins can be used as particulate in chromatographic supports.

SUMMARY OF THE INVENTION

In contrast to the teachings of the prior art, it has been found that water swellable particles which undergo dimensional changes are undesirable in the chromatographic process. It has been found that non-swellable sorptive particles, rather than swellable particles are especially useful and provide a desirable sorbent in chromatographic processes.

Briefly, the present invention provides a composite chromatographic article comprising:
(a) a polytetrafluoroethylene (PTFE) fibril matrix, and
(b) non-swellable sorptive particles enmeshed in said matrix, the ratio of non-swellable sorptive particles to PTFE being in the range of 19:1 to 4:1 by weight, said composite article having a net surface energy in the range of 20 to 300 milliNewtons per meter.

In another aspect, the present invention provides a method for providing fibrillated, semi-rigid, PTFE composite sheets having chromatographically active non-swellable sorptive particles enmeshed and evenly distributed therein. These materials can be prepared from chromatographically active non-swellable sorptive particles and a PTFE emulsion via a variation of the work intensive procedure described in U.S. Pat. No. 4,153,661, which procedure is incorporated herein by reference. Even distribution of particulate in the PTFE matrix does not allow for channeling of solutions flowing therethrough.

The chromatographic articles of the invention are useful in chemical and biochemical separations and analyses.

In a further aspect, the present invention provides a method for chromatographic separation and analysis using the composite article disclosed herein.

In this application:
"matrix" means an open-structured entangled mass of microfibers;
"hydrophobic particles" mean particles with low surface polarity, i.e. in the range of 0.1–0.5;
"semi-rigid" means flexible, dimensionally stable, and nonconformable; creasing results in cracking;
"ceramic" means nonmetallic, inorganic materials;
"direct phase system" means a more polar stationary phase with a less polar moving phase;
"reverse phase system" means a less polar stationary phase with a more polar moving phase;
"non-swellable particulate" means particulate having a change in volume,
   wherein change in volume=$V_g-V_o/V_o$, of less then 0.5, preferably less than 0.1, most preferably less than 0.01, where $V_g$ is the volume of the particulate when swollen and $V_o$ is the volume of the dry particulate.
"particles" or "particulate" means fibers of diameter 1 to 100 micrometers, with a length to diameter ratio of 1 to 20, in addition to particles as defined below;
"net surface energy" means the sum of polar and non-polar surface tensions;
"self-supporting" means that no rigid backing support is needed for the article; and
"sorbent" or "sorptive" means capable of taking up and holding by either absorption or adsorption.

Heretofore, the chromatographer or separation scientist skilled in the art selected a chromatographic sorbent which operated in either a direct, sorbent phase mode or in a reverse phase mode, or prepared an aggregation thereof, depending on the nature of the material to be separated and/or purified. The aggregation of sorbent particles then become an integral combination within the PTFE matrix.

In contrast, the present invention teaches chromatographic articles which can be operated concomitantly in a combination of both the direct and the reverse phase modes. Dictation of these modes is determined and controlled by the ratio of PTFE matrix and direct phase sorbent that are intimately present in fabricated chromatographic articles of this invention.

BRIEF DESCRIPTION OF THE DRAWING

In the accompanying Drawing:

FIG. 3 is a top plan view of a variation of the embodiment of FIG. 2 which has been used for an analytical separation;

FIG. 4 is a top plan view of another embodiment of the invention in which a chromatographic strip has been used for an analytical separation.

DETAILED DESCRIPTION OF THE DRAWING

Figure 1:
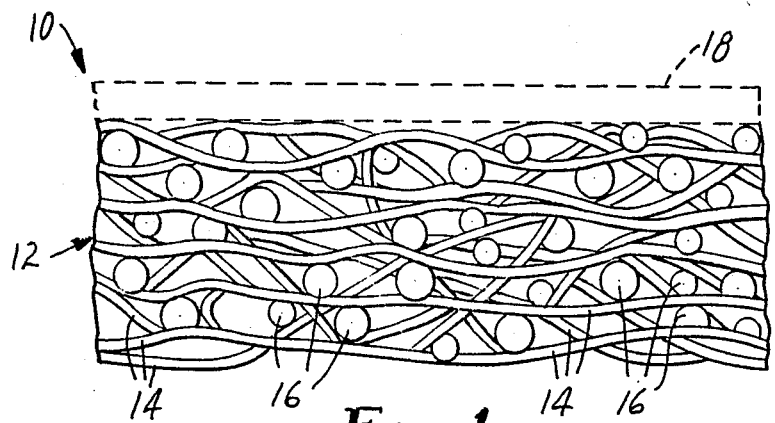
FIG. 1 is a cross-sectional view, greatly enlarged, of a composite article of the present invention.

FIG. 1 shows one embodiment of a composite article 10 according to the present invention having matrix 12 of PTFE fibrils 14 in which are enmeshed active, sorptive, non-swellable particles 16. Support 18, shown in broken lines, is optionally included in the composite article.

Figure 2:
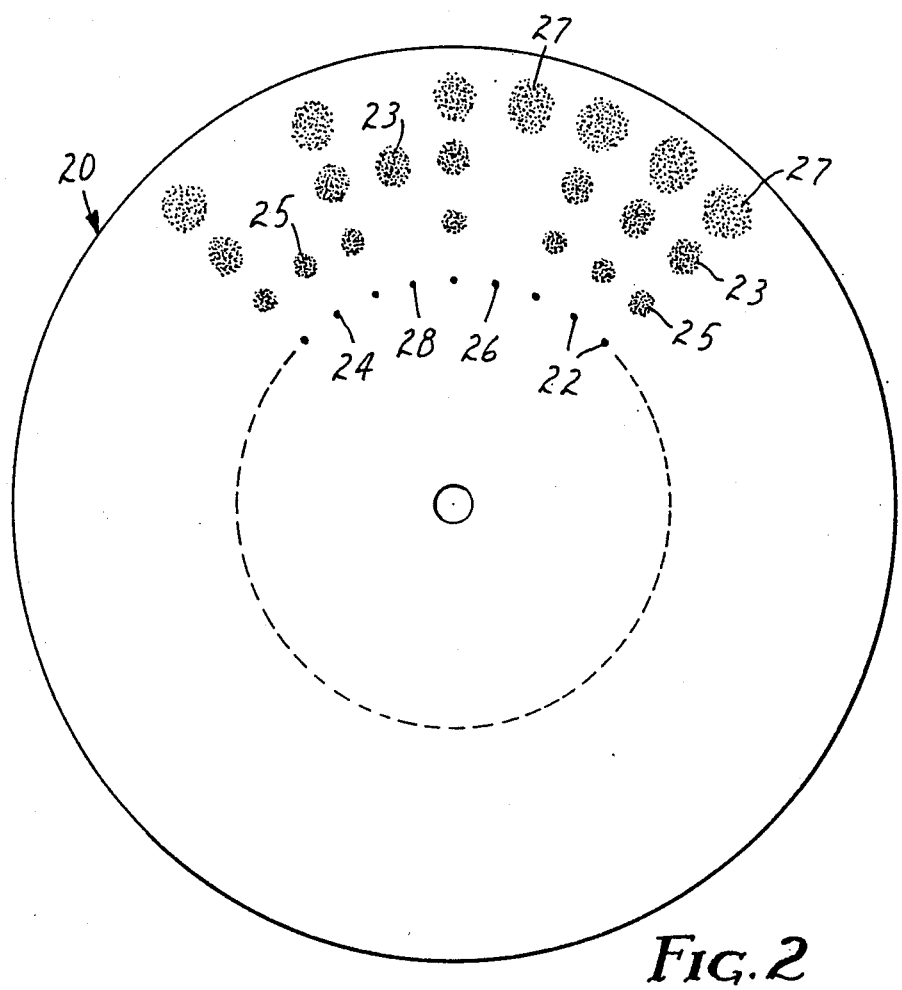
FIG. 2 is a top plan view of one embodiment of the invention which is a circular composite chromatographic disk that has been used for an analytical separation.

FIG. 2 shows self-supporting chromatographic disk 20 having a PTFE to silica ratio of 10.90. In one embodiment, spots 22, 24, 26, and 28 of a solution of one or three components have been placed, separated from each other, in a circular configuration and then disk 20 has been subjected to spinning. With continuous spinning (rotating), solvent is wicked onto the disk just inside of the spotted circular configuration. While spinning continues, solvent is continuously added and is forced outward by centrifugal forces. A separation occurs into spots 25, 23, and 27. Spots 24, 28, and 26 are solutions of a single component which, after spinning, show migration of the component to spots 25, 23, and 27, respectively. Spots 22 represent a solution of a mixture of three components which, after spinning, show migration of the resolved and separated components as spots 25, 23, and 27. When spots 22 were a dye mixture of Methyl Yellow, Sudan Red, and Indophenol Blue in organic solvent (e.g. toluene), the separation showed Indophenol Blue spots 25, Sudan Red spots 23, and Methyl Yellow spots 27. When spot 24 was a solution of Indophenol Blue in organic solvent, spot 25 was a blue spot. When spot 26 was a solution of Methyl Yellow in organic solvent, spot 27 was a yellow spot. When spot 28 was a solution of Sudan Red in organic solvent, spot 23 was a red spot.

FIG. 3 shows a variation of the embodiment of FIG. 2. Self-supporting chromatographic disk 30 having a PTFE/silica ratio of 10/90 is allowed to spin while a source of organic solution (i.e., sample) containing components to be separated comes in contact with disk 30. This forms circular zone 32 of deposited sample. This process is well known in the art and is called radial chromatography. While spinning continues solvent is added to sample 32 and is forced outward by centrifugal forces A separation (resolution of the mixture) occurs into circular component bands 33, 35, and 37. When the three components are the same dyes as used in the embodiment of FIG. 2 (dissolved in toluene), bands separated as Indophenol Blue band 33, Sudan Red band 35, and Methyl Yellow band 37.

FIG. 4 shows another embodiment of the invention. Thin (0.75 mm) chromatographic strip 40, having a PTFE/silica ratio of 20/80, has been inscribed with spot 42, a solution of three components. The strip was allowed to be in contact with a solvent (e.g. 0.5% methanol in methylene chloride) for a time sufficient to allow the solvent to be wicked up strip 40 by capillary action. This resulted in the separation of components into spots 43, 45, and 47. When the components were the same three dyes as disclosed in FIG. 2, spot 43 separated as Indophenol Blue, spot 45 separated as Sudan Red, and spot 47 separated as Methyl Yellow.

DETAILED DESCRIPTION

The particulate material (which can be one material or a combination of materials) useful in the present invention is non-swellable in aqueous and organic media and is substantially insoluble in water or the elution solvent. Not more than 1.0 gram of particulate will dissolve in 100 g. of aqueous media or elution solvent into which particulate is mixed at 20° C. The particulate material can be an organic compound, a polymer, or an inorganic oxide such as silica, alumina, titania, zirconia, and other ceramics, or it can be ion exchange or chelating particles. Preferred particulate material are silica and zirconia, with silica being particularly preferred because of the ease in bonding a variety of hydrophobic and semi-hydrophobic coatings onto its surface and because they are commercially available.

Suitable particles for the purposes of this invention include any particle which can be coated with insoluble, non-swellable sorbent material or the surface (external and/or internal) of which can be derivatized to provide a coating of insoluble, non-swellable sorbent material. Preferred supports for such coatings include inorganic oxide particles, most preferably silica particles. The insoluble, non-swellable sorbent coatings generally have a thickness in the range of one molecular monolayer to about 300 micrometers. Such particles having coated surfaces are well known in the art, see, for example, Snyder and Kirkland, "Introduction to Modern Liquid Chromatography", 2d Ed., John Wiley & Sons, Inc. (1979) and H. Figge et al., "Journal of Chromatography" 351 (1986) 393–408. The coatings can be mechanically applied by insitu crosslinking of polymers or the coatings can be functional groups covalently bonded to the surface of the particles. Many such coated particles are commercially available (e.g., $C_{18}$ bonded phase silica, Alltech, Deerfield, IL).

Coatings which can be applied to silica particulate can be either thin mechanical coatings of insoluble, non-swellable polymers such as crosslinked silicones, polybutadienes, etc. or covalently bonded organic groups such as aliphatic groups of varying chain length (e.g., $C_2$, $C_8$, and $C_{18}$) and aliphatic and aromatic groups containing amine, nitrile, hydroxyl, chiral, and other functionalities which alter the polarity of the coating. The silica, or other support particle, in this case acts primarily as a carrier for the organic coatings and the particles are non-swellable. The variation in chemical composition of the coatings provides selectivity in molecular separations and polarity.

The particulate material may have a spherical shape, a regular shape or an irregular shape. Particulate material which has been found useful in the invention has an apparent size within the range of 0.1 to about 600 micrometers, preferably in the range of 1 to 100 micrometers. It has been found advantageous in some instances to employ particulate materials in two or more particle size ranges falling within the broad range. As an example, particles having an average size in the range of 0.1–30 micrometers having chromatographic activity may be employed in combination with particles having an average size in the range 1 to 250 micrometers acting as a property modifier.

Some particle size reduction may take place during the high shear mixing and the calendering operations, depending upon the friability of the particulate material. Thus, while the particulate material initially may be rather large, it may ultimately be reduced to a finer size in the final product.

Particles useful in the present invention have water sorptive capacity less than 10% by weight, preferably less than 1% by weight. As noted above, particles which undergo dimensional changes due to water swellability are less desirable. In view of the teachings of U.S. Pats. 4,565,663 and 4,460,642 it is surprising that hydrophobic particles and other non-swellable particles enmeshed in PTFE provide superior chromatographic articles compared to water-swellable hydrophilic particles enmeshed in PTFE.

As described in the method of U.S. Pat. No. 4,153,661, the active sorbent particles useful in the present invention can be pre-mixed with a property modifier which can function, for example, as processing aid. Representative non-swellable property modifiers (some of which may be soluble in water) can be coated particles (e.g., cation exchange resins) calcium carbonate, ammonium carbonate, kaolin, sugar, polyethylenes, polypropylenes, polyesters, polyamides, polyurethanes, polycarbonates, zeolites, chitin, vermiculite, clay, ceramics, ion exchange and chelating particles, and the like. These property modifier materials can be present in an amount in the range of 0 to 28.99 parts per part of PTFE, preferably 0 to 9.00 parts per part of PTFE, provided that the sorbent non-swellable particles plus property modifiers do not exceed 29 parts particulate to 1 part PTFE. These ranges are desirable to achieve a preferred tensile strength of at least 0.5 MegaPascal (MPa) in the composite structure.

Other non water-swellable property modifiers may be advantageously added to the mixture of the PTFE aqueous dispersion and the primary particulate material to provide further improvement in or modification of the composite films of the invention. For example, modifier particulate can include chromatographically inactive materials such as low surface area glass beads to act as property modifiers and processing aids. It is desirable from a surface energy standpoint to minimize the PTFE level and at times to alter the level of the active particulate. Coloring or fluorescesing particulate can be added at low levels (up to 10 weight percent of particulate) to aid in visualizing sample components to be separated. Chemically active particulate which indicate pH or acidity of the component bands can be useful for diagnostic purposes.

A limited amount of water-swellable property modifiers (i.e., up to 30 weight percent, preferably less than 25 weight percent, more preferably less than 10 weight percent, and most preferably less than 1 weight percent, of total particulate) can be useful as a processing aid. Representative swellable property modifiers include starch, chitosan, modified starches such as Sephadex TM and Sepharose TM (Pharmacia, Sweden), agarose, polymethacrylates, styrene-divinylbenzene copolymers, polyacrylamides, cellulosics, and coated particles (e.g., silica coated with a polyacrylamide). Water-swellable materials may be used as a thin coating on non-swellable particulate.

When the particulate is hydrophobic, the preferred method of manufacture of the article of the invention utilizes an emulsion of PTFE with a masking agent added to modify the hydrophobic particle surface/water interaction and allowing rapid wetting of the surface of the hydrophobic particulate. Preferred masking agents are polar organic compounds such as alcohols, amines, acids, etc. with the preferred group being alcohols due to their efficacious removability as by solvent extraction or drying after formation of the article.

Specifically, the PTFE composite sheet material of the invention is prepared by dry blending the particulate or combination of particulates employed until a uniform dispersion is obtained and adding a volume of masking agent up to approximately one half the volume of the blended particulate. The blending takes place along with sufficient lubricant water to exceed the sorptive capacity of the particles. The aqueous PTFE dispersion is then blended with the particulate/masking agent mixture to form a mass having a putty-like or dough-like consistency. The sorptive capacity of the solids of the mixture is noted to have been exceeded when small amounts of water can no longer be incorporated into the mass without separation. Care should be taken to ensure that the ratio of water to masking agent does not exceed 3:1. This condition should be maintained throughout the entire mixing operation. The putty-like mass is then subjected to intensive mixing at a temperature maintained between about 50° C. and 100° C. for a time sufficient to cause initial fibrillation of the PTFE particles. Minimizing the mixing at the specified temperature is essential in obtaining chromatographic transport properties.

Mixing times will typically vary from 0.2 to 2 minutes to obtain the necessary initial fibrillation of the PTFE particles. Initial fibrillation causes partial disoriented fibrillation of a substantial portion of the PTFE particles.

Initial fibrillation will be noted to be at an optimum within 60 seconds after the point when all components have been fully incorporated together into a putty-like (dough like) consistency. Mixing beyond this point will produce a composite sheet of inferior chromatographic properties.

The devices employed for obtaining the necessary intensive mixing are commercially available intensive mixing devices which are sometimes referred to as internal mixers, kneading mixers, double-blade batch mixers as well as intensive mixers and twin screw compounding mixers. The most popular mixer of this type is the sigma-blade or sigma-arm mixer. Some commercially available mixers of this type are those sold under the common designations Banbury mixer, Mogul mixer, C. W. Brabender Prep mixer and C. W. Brabender sigma blade mixer. Other suitable intensive mixing devices may also be used.

The putty-like mass is then transferred to a calendering device where it is calendered between rolls maintained at about 50° C. to about 100° C. to cause additional fibrillation and consolidation of the PTFE particles, while maintaining the water level of the mass at least at a level of near the absorptive capacity of the solids, until sufficient fibrillation occurs to produce the desired chromatographic sheet material. Preferably the calendering rolls are made of a rigid material such as steel. A useful calendering device has a pair of rotatable opposed calendering rolls each of which may be heated and one of which may be adjusted toward the other to reduce the gap or nip between the two. Typically, the gap is adjusted to a setting of 10 millimeters for the initial pass of the mass and, as calendering operations progress, the gap is reduced until adequate consolidation occurs. At the end of the initial calendering operation, the sheet is folded and then rotated 90° to obtain biaxial fibrillation of the PTFE particles. Smaller rotational angles (e.g., 20° to less than 90°) may be preferred in some chromatographic applications to reduce calender biasing, i.e., unidirectional fibrillation and orientation. Excessive calendering (generally more than two times) in thin layer chromatographic composites reduces the solvent flow rate resulting in longer run times per separation.

The calendered sheet is then dried under conditions which promote rapid water evaporation yet will not cause damage to the composite sheet or any constituent therein. Preferably the drying is carried out at a temperature below 200° C. The preferred means of drying is by use of a forced air oven. The preferred drying temperature range is from 20° C. to about 70° C. The most convenient drying method involves suspending the composite sheet at room temperature for at least 24 hours. The time for drying may vary depending upon the particular composition, some particulate materials having a tendency to retain water more than others.

The chromatographic activity of particulate such as alumina or silica used in the direct phase mode is adjustable by control of the water content. It is known in the art that the activity of alumina and silica can be modified by addition of water. Selection of drying conditions affects the activity of these particles. Drying conditions must be individually determined to obtain optimal separations of given samples. These conditions are available from particulate suppliers' literature, journal publications, and experimentation. Vacuum oven drying is recommended in some applications. Typically, drying times will vary from about 1 hour to about 100 hours.

The resultant composite sheet has a tensile strength when measured by a suitable tensile testing device such as an Instron (Canton, Mass.) tensile testing device of at least 0.5 MPa. The resulting composite sheet has uniform porosity and a void volume of at least 30% of total volume.

The PTFE aqueous dispersion employed in producing the PTFE composite sheet of the invention is a milky-white aqueous suspension of minute PTFE particles. Typically, the PTFE aqueous dispersion will contain about 30% to about 70% by weight solids, the major portion of such solids being PTFE particles having a particle size in the range of about 0.05 to about 0.5 microns. The commercially available PTFE aqueous dispersion may contain other ingredients, for example, surfactant materials and stabilizers which promote continued suspension of the PTFE particles.

Such PTFE aqueous dispersions are presently commercially available from Dupont de Nemours Chemical Corp., for example, under the trade names Teflon TM 30, Teflon TM 30B or Teflon TM 42. Teflon TM 30 and Teflon TM 30B contain about 59% to about 61% solids by weight which are for the most part 0.05 to 0.5 micrometer pTFE particles and from about 5.5% to about 6.5% by weight (based on weight of PTFE resin) of non-ionic wetting agent, typically octylphenol polyoxyethylene or nonylphenol polyoxyethylene. Teflon TM 42 contains about 32 to 35% by weight solids and no wetting agent but has a surface layer of organic solvent to prevent evaporation. It is generally desirable to remove, by organic solvent extraction, any residual surfactant or wetting agent after formation of the article.

Silica is available from Aldrich Chemical Co. (Milwaukee, WI). Zirconia is available from Z. Tech Corporation (Bow, NH). Other inorganic oxides are available (Aldrich Chemical Co.).

The present invention provides a novel composite structure and method therefore, the composite structure preferably being a uniformly porous, composite sheet comprised of non water-swellable sorptive particles distributed uniformly throughout a matrix formed of interentangled, fibrillated PTFE fibrils. In such a structure almost all of the particles are separate one from another and each is isolated in a cage that restrains the particle on all sides by a fibrillated mesh of PTFE microfibers. The preferred novel sheet of the invention has a thickness in the range of 125 to 10,000 micrometers and has a tensile strength of at least 0.5 MPa and even as high as 13.6 MPa. The article is substantially uniformly porous, making it suited for use as a chromatographic composite article which can be used as a single self-supporting sheet or a combination of sheets to form a stack or as a composite film adhered to a support such as glass, paper, metals, or polymers.

The PTFE-particulate technology can be useful in a first mode wherein the composite article of the invention is used for preconcentration and isolation of certain materials for further analysis by high resolution column chromatography. In this mode, which is well known in the art, solvent and sample flow are introduced at an angle of 90 degrees to the surface of the sheet. This is a conventional configuration and the separation path length is equal to the thickness of the sheet. The path length can be increased by stacking additional layers but the individual layers are not intimately bound together since the calendering operation is limited to a specific thickness. This mode is effective for one step or multi step adsorption-desorption separations. This mode is effective using reactive particulate such as non-swellable cation exchange materials or sorptive particulate in the direct or reverse phase modes. We can expand the utility of this membrane mode by inclusion of many other reactive particulates to carry out chemical and physical reactions to be described. The article strongly adsorbs the component of interest onto the active (non-swellable) particulate in the composite and undesirable components are washed out with a first solvent. A stronger, generally more polar second solvent is then used to displace the desired component from the particulate allowing it to be recovered in a more concentrated and unified form. We found we could also form reactive membranes choosing particulate for ion exchange, chelation, oxidation/reduction reactions, steric exclusion, catalysis, etc.

In a second mode, the flow is parallel to the surface or 0 degrees into the edge of the sheet and the path length for the separation can be selected from the length of the material used and the ability to transport solvent by capillary action. Multiple, continuous sorption and desorption steps are needed to obtain chromatrographic separations and require a minimum column length which is not practical to obtain by stacking disks of the composite in column configuration.

In the second mode, the separations and analysis is analogous to thin layer or paper chromatography where solvents and sample components are also transported through the media by capillary action. The composite can be useful in a paper (PC) or thin layer chromatographic (TLC) mode where the separations are obtained not through the composite at a 90 degree mode but edgewise at a 0 degree mode.

It is believed that the migration rates through the composite article is proportional to the net surface energies of the PTFE filaments, the chromatographically active particulate such as silica, and a modifier particulate. The small amount of PTFE appears to dominate these rates. This may be due to the construction wherein the active silica particles do not touch each other and the solvent mobility is dependent on the low surface energy PTFE fibrils. Electron beam treatment of the PTFE matrix was investigated and increased the migration rates by 10%. In a preferred mode, using silica as particulate, a number of experiments were performed varying the ratios from 95/5 to 80/20 (silica/PTFE) and we found that the higher the silica content, the faster the rate of solvent and component migration.

The net surface energy of the composite article is the net weighted average of the surface energies of PTFE marix ($E_{PTFE}$), the active sorptive particulate ($E_{part}$), and modifying particulate ($E_{mod}$). It is desirable that the net surface energy be in the range of 20 to 300 milliNewtons per meter, preferably 50 to 300 mN/M. This provides optimization of surface tension forces for solvent and solute transport. The net surface energy of a particulate is comprised of polar and non-polar forces. Polarity is equal to the ratio of polar surface tension to the total surface tension. Polarity of PTFE, Nylon 66, and silica are calculated from surface tension data to be 0.10, 0.21, and 0.38, respectively.

The composite articles of the present invention have high capacity for sample loading and can be very useful for preparatory or process scale chromatography. The migration rate can be increased dramatically using radial chromatography wherein centrifical force is utilized to drive the solvent through the chromatographic article. This process is well known in the art. In the prior art chomatographic materials, higher amounts of binder are normally needed to hold the silica to the conventional spinning glass plate, whereas in the present invention articles the PTFE material needs no binder or supporting plate. In the prior art, particulates successfully adhered to glass plates have been limited to silica and alumina. The present invention has a great advantage in that virtually any non-swellable organic or inorganic particulate can be trapped in the PTFE matrix for many chromatographic applications. No polar binder is required. The absence of the polar binder is of particular significance in reverse phase systems with non-swellable hydrophobic particulate.

The composite chromagraphic articles of the invention can be of any desired size and shape. Preferably the articles can be sheet-like materials which, for example, can be in disk or strip form. Coating the non-swellable particulate with very thin (monolayer) materials or thicker materials provided by in-situ crosslinking of polymers or covalently bonding functional molecules on the surface of the particulate allows for the optimization of the both chromatographic selectivity and separation efficiency.

The composite articles have utility in a wide variety of separations wherein the choice of the particulate material is useful for size controlled filtration or steric exclusion, for simple one step or multistep adsorption-desorption separations of specific components, for immobilization of reactive particulate to perform chemical or biochemical reactions, for ion-exchange conversion and isolation of cations and anions, for purification of materials, and for chromatographic separations and analyses in both passive and forced flow modes, for hydrophobic reverse phase and direct phase chromatography.

Objects and advantages of this invention are further illustrated by the following examples, but the particular materials and amounts thereof recited in these examples, as well as other conditions and details, should not be construed to unduly limit this invention.

EXAMPLE 1

Method of making a 20/80 PTFE/hydroxylapatite composite article was as follows:

Twenty grams of hydroxylapatite HTP grade (calcium phosphate available from Bio Rad, Inc. of Richmond, Ca) was placed in a 100 ml beaker. Eight and $\frac{1}{3}$ grams of polytetrafluoroethylene (PTFE) resin emulsion (Teflon ™ 30B, Dupont, Inc , Wilmington, DE) was added stepwise in three portions with intermittent vigorous stirring. Fifteen grams of water was then added stepwise in three portions with intermittent vigorous stirring.

After these ingredients had been thoroughly mixed, a semi-coherent material was formed with enough physical integrity to allow the entire contents to be removed from the beaker as a single mass. The above mass was passed through two rollers kept at 50° C. and spaced about 0.5 cm apart to give a strip of cohesive material of dimensions approximately 15 cm×0.5 cm×5 cm. The resulting strip was folded to three thicknesses or a material having dimensions of 5 cm×1.5 cm×5 cm and then passed through the rollers after a 90° rotation from the previous pass. The cyclic process of three-layer folding and re-rolling in the direction 90° from the direction of the preceding pass was repeated a total of 10 times to give a tough, strong, flat piece of material of dimensions 5 cm×1.5 cm×5 cm. The material was then calendered along the long axis through a set of ten rollers which were spaced at successively smaller distances apart to give a continuous ribbon of dimensions 8 cm×0.1 cm×80 cm. The ribbon was folded to give a 8-layered piece of dimensions 8 cm×0.8 cm×10 cm. The 8-layered piece was then calendered as before along the 10 cm axis (90° ) from the calendering direction used previously) to give a ribbon of dimensions 16 cm×0.08 cm×20 cm. By calendering using varying spaced rollers, different degrees of compaction of the mass could be obtained and various thicknesses of ribbon, as desired, realized. The calendered sheet of material was washed in a water bath and then allowed to dry in air for 48 hours.

Proteins (horse) were separated in a one step adsorption, three step desorption process with successfully higher ionic strength solutions. A 25 millimeter, 50 micrometers thick disk with a PTFE to hydroxylapatite ratio of 20 to 80 was placed in vacuum filter holder and preconditioned by addition of 3 millimolar phosphate buffer at pH of 6.8. Flow rate was 1.75 milliliters per minute per square centimeter. 50 microliter of a solution of Hemoglobin, Myoglobin, and Cytochrome C (Sigma Chemical Corp., St. Louis, MO) in 3 millimolar buffer containing 0.01 weight percent sodium azide was deposited onto the disk. In the first desorption step, 50 millimolar phosphate buffer solution effectively removed the Hemoglobin protein. In the second step, 200 millimolar buffer solution desorbed the Myoglobin protein and in the third step, 500 millimolar buffer displaced the Cytochrome C. This separation was readily upgraded to longer path length modes where solvent was introduced through the lengthwise direction of the composite as in the thin layer embodiment, centrifugal force assisted, or with gradient elution pumping systems wherein the ionic strength or pH of the mobile solvent phase was changed in a continuous rather than a stepwise fashion. A variety of active particulate in the polysacharide class such as agarose, sepharose, cellulose, chitosan, etc. either native or derivatized, are useful in the adsorption, gel permeation or affinity chromatographic modes for biochemical type separation. Other particulates that can be used include polyacrylamides, polymethacrylates, and cross-linked copolymers such as styrene-divinylbenzene copolymers are useful for a variety of chromatographic separations.

EXAMPLE 2

Twenty grams of TLC grade silica (available from Aldrich Chemical Co., Milwaukee, WI, was placed in a 100 ml beaker. 8.3 grams of polytetrafluoroethylene (PTFE) resin emulsion (Teflon 30B, Dupont) was added stepwise in three portions with intermittent vigorous stirring. Fifteen grams of water was then added stepwise in three portions with intermittent vigorous stirring. After formation of a putty-like mass, additional processing was performed according to the procedure of Example 1.

Runs analogous to thin layer chromatography were carried out with the standard material where the ratio of PTFE to silica was 20/80. This ratio is generally chosen to impart tear resistance, rigidity, and other physical properties to the membrane. In these evaluations, a 225 micrometer (15 mil) thick membrane was spotted with sample (a dye mixture of Methyl yellow, Sudan Red, and Indophenol Blue) as in conventional thin layer chromatography and the strip (1.5 cm wide, 12.5 cm long) was suspended via a wire holder in a 50 ml graduated cylinder. Enough solvent (0.5% methanol in methylene chloride) was added to contact the lower edge of the strip. The solvent wicks up the strip by capillary action and the sample components are separated according to their differences in partitioning coefficients between the moving solvent front and the stationary absorptive particulate. Those components more strongly absorbed to the particulate move more slowly and separations obtained indicated that the surface activity of the particulate was not diminished by its inclusion in the PTFE web. We were surprised to find that while separation of components was obtained, the rate of solvent and solute migration was approximately 40 times slower than with a conventional TLC plate even though the material was 80 percent silica. (Conventional TLC plate coatings are approximately 87 percent silica with 13 percent $CaSO_4\text{-}(H_2O)_n$ used to bind the silica to the glass plate.) Runs were then performed to define the effect of ratios of particulate to PTFE. Calendering parameters, and modifying particulate will be described later.

Using a similar procedure as described for the 20/80 articles, articles having a 10/90 ratio of PTFE to silica were prepared as follows:

Twenty grams of TLC grade silica (available from Aldrich Chemical Co., Milwaukee, WI) was added to a 100 ml beaker. 3.7 grams of polytetrafluroethylene (PTFE) resin emulsion (Teflon 30B, Dupont) was added stepwise in two portions with intermittent vigorous stirring. Twenty grams of water were then added stepwise in four portions with intermittent vigorous stirring. After formation of a putty-like mass, additional processing was performed according to the procedure of Example 1.

TABLE 1, below, gives data on elution time vs solvent front travel for a commercially available MERCK TLC plate, a 10/90 ratio of PTFE/silica (10A), and a 20/80 ratio of PTFE/silica (20A).

TABLE 1

| | Composition vs. Rate of Trend | | | |
|---|---|---|---|---|
| Point on Time Curve | mm TRAVEL | Control (min) | 10A (min) | 20A (min) |
| 2 | 5 | 0.16 | 0.75 | 1.50 |
| 3 | 10 | 0.47 | 1.83 | 4.16 |
| 4 | 15 | 0.93 | 3.50 | 9.00 |
| 5 | 20 | 1.66 | 5.75 | 15.16 |
| 6 | 25 | 2.50 | 8.42 | 23.16 |
| 7 | 30 | 3.50 | 11.50 | 32.16 |
| 8 | 35 | 4.75 | 15.16 | 42.00 |
| 9 | 40 | 5.93 | 18.42 | 50.50 |
| 10 | 45 | 7.16 | 21.50 | 58.66 |
| 11 | 50 | 8.66 | 24.50 | 67.00 |

The data of TABLE 1 show that the solvent front rate of travel for composites of the invention was less than rate of travel using a conventional TLC plate. The rate of travel for composite 10A containing 10% PTFE was two to three times faster than composite 20A containing 20% PTFE.

Careful examination of the data shows that the differences in rate of travel increase with increasing distances of solvent travel from the origin. The distance of travel and time of separation chosen in practice is dependent on the ability of the chromatographic system to separate or resolve the components in the sample mixture. The efficiency of the chromatographic system or its ability to separate the components in a sample mixture is dependent on a number of factors. If the solvent flow rate is too high or too low, the resolution is degraded. Flow rates on the commercial silica coated glass plate are dictated and fixed by the capillary action contributions of the active particulate, the binder used to hold the particulate in place, and the glass or plastic plate used to support the particulate-binder media. In this invention, the flow rates are controllable by optimizing the composition of the matrix and the ratios of PTFE, active particulate, and modifying particulate.

A second factor affecting the resolution of the chromatographic separation is the size and surface area of the active particulate. In general, the smaller the particle, the better the resolution. Particles as small as 3 to 5 micrometers have been used in high resolution chromatographic columns. These columns can be much shorter and yet deliver the same resolution as longer columns with larger particles. A limiting factor is the pressure drop and the difficulty in uniform packing of the column. In this invention, the particle size can be as small as 0.1 micron and therefore shorter separation paths are possible.

We also studied the method of making and calendering the membrane and found that the more heavily calendered membranes had dramatically slower rates. TABLE 2 illustrates the elution time data for a series of samples 10A through 10D and a Merck control silica plate.

EXAMPLE 3

TABLE 2

Effect of Calendaring on Rate of Trend

| Sample | mm Travel | Control Plate (min) | Sample 10A (min) | Sample 10B (min) | Sample 10C (min) | Sample 10D (min) |
|---|---|---|---|---|---|---|
| 12 |    | 0    | 0    | 0    | 0    | 0    |
| 13 | 5  | .17  | 1    | .75  | .75  | 1.5  |
| 14 | 10 | .37  | 1.5  | 2.0  | 2.0  | 4.0  |
| 15 | 15 | .75  | 2.25 | 4.0  | 4.5  | 11.0 |
| 16 | 20 | 1.5  | 3.08 | 6.5  | 7.33 | 17.5 |
| 17 | 25 | 2.2  | 5.5  | 9.25 | 11   | 26   |
| 18 | 30 | 3.08 | 7.5  | 13   | 15   | 36   |
| 19 | 35 | 4.03 | 10   | 16   | 20   | 43   |
| 20 | 40 | 5.0  | 13   | 20   | 24   | 51   |
| 21 | 45 | 6.08 | 16   | 24   | 28   | 58   |
| 22 | 50 | 7.0  | 18.5 | 28   |      |      |
| 23 | 55 | 8.33 | 21   |      |      |      |

The data of TABLE 2 show the effect of method of making on the chromatographic properties of the composite. Samples 10A through 10D are identical in composition, i.e., 10 percent PTFE-90 percent silica; but differ in the degrees of calendering. 10A, 10B, 10C, and 10D have been calendered 1, 2, 3, 4 times respectively. The data show that calendering greatly increases the time required for the solvent front to travel a given distance. Increased working of the PTFE increases the effect of the low surface energy of the PTFE on the net behavior of the composite. In this invention the diffusion of solvent by capillary action can be controlled by the degree of calendering.

In a third embodiment, the separations and analysis obtained by capillary action are assisted by centrifugal force as in radial chromatography. In prior art, the active chromatographic particulate is mixed with a binder such as starch or calcium sulfate and the mixture is coated onto a circular glass disk. After drying and scraping the coating to obtain a smooth uniform surface, the disk is rotated, typically at 700 rpm, and the silica is prewetted with solvent. Solvent is "wicked" onto the disk near the center and is drawn through the chromatographic media to the outer edge by centrifical force. Sample is then wicked onto the surface of the disk and appears as a continuous circle near the center of the disk. Solvent flow is then initiated and as separation occurs, circles of increasing diameter appear for each component of the sample mixture. It is difficult to adhere the particulate to the plate in this case and to date only silica and alumina are in general use.

In this invention, no binder, i.e., calcium sulfate, needed since the inert PTFE fibrils hold the particulate in place. Therefore virtually any organic or inorganic particulate can be incorporated into the matrix in disk form, greatly expanding the utility of the chomatographic separation process.

Composites of 750 to 3750 micrometers (30 to 150 mils) in thickness have sufficient dimensional stability or rigidness to be rotated at 700 rpm without additional support. Thinner composites between 250 to 750 micrometers (10 and 30 mils) can be supported with a rigid disk of low surface energy such a Teflon, certain plastics resistant to solvent flow, and coated glass. The PTFE-particulate composite is not adhered to the rigid disk which only serves to support it when it is not spinning. The low surface energy surface of the supporting disk minimizes solvent streaking. Sample can be introduced to the disk (FIG. 3) either as a continuous circular line (#32) by the wicking operation as described or can be added as discreet spots to the stationary disk as shown in FIG. 2. We found that when thicker disks are used for larger scale separations, it is advantageous to inject the sample into the disk rather than to spot it onto the surface. Solvent flow is then initiated and components of the sample mixture are separated into bands as in thin layer chromatography but more rapidly due to the forced flow provided by the centrifical force on the spinning disk. In FIG. 3, the three compounds separated are Indophenol Blue, Sudan Red, and Methyl Yellow. When the samples are injected into the disk as shown in FIG. 2, it is possible to inject up to 32 samples or reference compounds on a 6 inch diameter disk. This allows the analyst to compare the migration rates of known compounds with those rates observed in the sample mixture. The material is easily cut for isolation purposes. For example a cork borer can be used to remove any spot on the disk. Extracting the spot with a solvent allows the analyst to recover the purified material for subsequent tests without the contamination from silica or binder particulate.

Alternatively, the solvent flow can be continued, washing the separated bands of sample components from the outer edge of the disk into individual collection vessels as is known in the literature. The disks can be thoroughly washed with solvent using an appropriate vacuum filtration funnel and oven dried for reuse with new samples.

Various modifications and alterations of this invention will become apparent to those skilled in the art without departing from the scope and spirit of this invention, and it should be understood that this invention is not to be unduly limited to the illustrative embodiments set forth herein

We claim:

1. A method of chromatographic separation comprising the steps of:
   (a) spotting a solution containing separable components in a circular configuration onto a rotatable chromatographic sheet-like article wherein said chromatographic sheet-like article is a composite article comprising:
      (1) a polytetra fluoroethylene fibril matrix, and
      (2) non-swellable sorptive particles enmeshed in said matrix, the ratio of non-swellable particles to PTFE being in the range of 19:1 to 4:1 by weight,
   said composite article having a net surface energy in the range of 20 to 300 milliNewtons per meter,
   (b) wicking solvent onto said chromatographic sheet-like article, just inside said spotted circular configuration, while said article is continuously rotating, to effect differential migration of said components and their separation.

2. The method according to claim 1 further comprising the step of individually collecting said resulting separated components.

3. The method according to claim 1 wherein said matrix further comprises in the range of more than zero and up to 28.99 parts per part of PTFE of non-swellable property modifying particles.

4. The method according to claim 3 wherein said consisting of calcium carbonate, ammonium carbonate, kaolin, sugar, polyethylenes, polypropylenes, polyesters, polyamides, polyurethanes, polycarbonates, zeolites, chitosan, glass beads, vermiculite, clay, ceramics, coloring or fluorescing particles, pH modifiers, and particles coated with these substances.

5. The method according to claim 1 further comprising water-swellable property modifying particles in an amount up to 30 weight percent of the total particles.

6. The method according to claim 5 wherein said water-swellable property modifying particles are selected from the group consisting of starch, modified starch, agarose, polyacrylamides, ion exchange and chelating particles, cellulosics, polymethacrylates, styrene-divinylbenzene copolymers, and chitosan.

7. The method according to claim 1 wherein said non-swellable particles are inorganic oxide.

8. The method according to claim 1 wherein said non-swellable particles are an organic compound.

9. The method according to claim 1 wherein said non-swellable particles are a polymer.

10. The method according to claim 1 wherein said non-swellable particles are at least one of silica and zirconia.

11. The method according to claim 1 wherein said non-swellable particles are silica.

12. The method according to claim 1 wherein said non-swellable particles are chelating or ion exchange particles.

13. The method according to claim 1 wherein said particles further comprise a layer of covalently bonded organic coating.

14. The method according to claim 1 wherein said particles further comprise a coating of non-swellable polymer.

15. The method according to claim 1 wherein said chromatographic article has been subjected to electron beam treatment.

16. The method according to claim 1 wherein said non-swellable particles are hydroxylapatite.

17. A method of chromatographic separation comprising the steps of:
    (a) depositing a solution containing separable components in a circular configuration onto a rotatable chromatographic sheet-like article to provide a circular zone of deposited solution, wherein said chromatographic sheet-like article is a composite article comprising:
        (1) a polytetrafluoroethylene fibril matrix, and
        (2) non-swellable sorptive particles enmeshed in said matrix, the ratio of non-swellable particles to PTFE being in the range of 19:1 to 4:1 by weight,
    said composite article having a net surface energy in the range of 20 to 300 milliNewtons per meter,
    (b) wicking solvent onto said chromatographic sheet-like article, just inside said circular zone, while said article is continuously rotating, to effect differential migration of said components and their separation.

18. The method according to claim 17 further comprising the step of individually collecting said resulting separated components.

19. The method according to claim 17 wherein said matrix further comprises in the range of more than zero and up to b 28.99 parts per part of PTFE of non-swellable property modifying particles.

20. The method according to claim 19, wherein said property modifying particles are selected from the group consisting of calcium carbonate, ammonium carbonate, kaolin, sugar, polyethylenes, polypropylenes, polyesters, polyamides, polyurethanes, polycarbonates, zeolites, chitosan, glass beads, vermiculite, clay, ceramics, coloring or fluorescing particles, pH modifiers, and particles coated with these substances.

21. The method according to claim 17 further comprising water-swellable property modifying particles in an amount up to 30 weight percent of the total particles.

22. The method according to claim 21 wherein said water-swellable property modifying particles are selected from the group consisting of starch, modified starch, agarose, polyacrylamides, ion exchange and chelating particles, cellulosics, polymethacrylates, styrene-divinylbenzene copolymers, and chitosan.

23. The method according to claim 17 wherein said non-swellable particles are inorganic oxide.

24. The method according to claim 17 wherein said non-swellable particles are an organic compound.

25. The method according to claim 17 wherein said non-swellable particles are a polymer.

26. The method according to claim 17 wherein said non-swellable particles are at least one of silica and zirconia.

27. The method according to claim 17 wherein said non-swellable particles are silica.

28. The method according to claim 17 wherein said non-swellable particles are chelating or ion exchange particles.

29. The method according to claim 17 wherein said particles further comprise a layer of covalently bonded organic coating.

30. The method according to claim 17 wherein said particles further comprise a coating of non-swellable polymer.

31. The method according to claim 17 where said chromatographic article has been subjected to electron beam treatment.

32. The method according to claim 17, wherein said non-swellable particles are hydroxylapatite.

* * * * *

UNITED STATES PATENT AND TRADEMARK OFFICE
CERTIFICATE OF CORRECTION

PATENT NO. : 4,906,378

DATED : March 6, 1990

INVENTOR(S) : Donald F. Hagen et al.

It is certified that error appears in the above-identified patent and that said Letters Patent is hereby corrected as shown below:

On the title page item [75] Inventor(s): delete "Louise A. Errede, North Oaks".

Col. 3, line 32, "ratio of 10.90" should read -- ratio of 10/90 --.

Col. 7, line 68, "pTFE" should read -- PTFE --.

Col. 15, line 1, after "said" kindly insert -- property modifying particles are selected from the group --.

Signed and Sealed this

Twenty-first Day of April, 1992

Attest:

HARRY F. MANBECK, JR.

*Attesting Officer*   *Commissioner of Patents and Trademarks*